United States Patent [19]

Takaki et al.

[11] Patent Number: 5,689,524
[45] Date of Patent: Nov. 18, 1997

[54] PN CODE SYNCHRONIZING METHOD AND TRANSMITTER AND RECEIVER IN SPREAD SPECTRUM COMMUNICATION SYSTEMS

[75] Inventors: Tetsuya Takaki; Kenji Ishida, both of Tokyo, Japan

[73] Assignee: NEC Corporation, Japan

[21] Appl. No.: 362,176

[22] Filed: Dec. 22, 1994

[30] Foreign Application Priority Data

Dec. 24, 1993 [JP] Japan ................................. 5-326788

[51] Int. Cl.$^6$ ............................................. H04L 27/30
[52] U.S. Cl. .................................................... 375/200
[58] Field of Search ........................... 375/200.21, 295, 375/316, 367, 340

[56] References Cited

U.S. PATENT DOCUMENTS 5,103,459  4/1992  Gilhousen et al. .

OTHER PUBLICATIONS

Becker, Henry and Fred Piper "Cipher Systems, Protection of Communications", Northwood Publications, 1982, London GB.

Primary Examiner—Stephen Chin
Assistant Examiner—Hai H. Phan
Attorney, Agent, or Firm—Ostrolenk, Faber, Gerb & Soffen LLP

[57] ABSTRACT

A PN code synchronizing method in spread spectrum communication systems of the present invention calculates a matrix H based on tap locations of a PN code generating shift register, also calculates an internal status of the PN code generating shift register at a time t+M by multiplying an internal status of the PN code generating shift register at a time t by M-th power of the matrix H, and transmits the internal status of the PN code generating shift register at a time t+M to reception side through a synchronous channel. in reception side, a PN code generating shift register therein is set based on the internal status of the PN code generating shift register at a time t+M.

19 Claims, 4 Drawing Sheets

PN CODE SYNCHRONIZING METHOD AND TRANSMITTER AND RECEIVER IN SPREAD SPECTRUM COMMUNICATION SYSTEMS

BACKGROUND OF THE INVENTION

This invention relates to a method for synchronizing spread spectrum PN code in mobile communication systems using spread spectrum communication systems, and more particularly to an art for reducing time to acquire synchronization of a PN code sequence for spreading used by both a transmitter and a receiver In conventional mobile communication systems using spread spectrum communication systems, in a transmitter voices, data, etc. are primarily modulated by PSK or the like, and the modulated data are spread by means of a code sequence such as a PN code (Pseudo Noise Code), etc. and the data and so on are transmitted to a receiver.

The receiver generates a PN code sequence that is the same as and synchronized with that of the transmitter and despreads received signals to obtain base band signals. Thus the signals are demodulated and the original voice and data, etc. are obtained.

In these spread spectrum communication systems, to establish synchronization of the PN code used in the transmitter and the receiver, it is known a method that the transmitter broadcasts a PN code phase to all of the receivers through a synchronous channel (TIA IS-95).

In this method, by receiving PN code phase data through a synchronous channel, the receiver can recognize the PN code phase.

In this method, however, when an PN code phase (an internal status of shift register) is carried through the synchronous channel, a time lag occurs.

In order to compensate for the time lag, it is suggested that the PN code sequence generator should be designed to run faster than actual operation so as to obtain a PN code phase at a predetermined future time. It is also suggested a method of providing another PN code sequence generator producing an advanced PN code phase and using a PN code phase with this generator.

Whereas, in achieving the proper acquisition of the PN synchronization using a prior art, when the advanced phase shift is to be calculated based on the current PN code, if the chip rate is slow or the PN code sequence length is short, the phase synchronizing operation works properly. But if the chip rate is fast and the PN code sequence length is long (for instance, $2^{42}-1$), tremendous quantity of calculation is necessary. In addition, to add another PN code sequence generator results increase of size of the circuitry.

SUMMARY OF THE INVENTION

It is an object of the present invention to make acquisition of synchronization of a PN code for spreading spectrum used in a transmitter and a receiver faster.

Another object of the present invention is to prevent increase of size of circuits of the transmitter and the receiver.

The above-mentioned objects of the present invention are achieved by a PN code synchronizing method in spread spectrum communication systems using a plurality of traffic channels and at least one synchronous channel, comprising: a step of calculating a matrix H based on tap locations of a PN code generating shift register; a step of multiplying an internal status of a PN code generating shift register at a time t by M-th power of the matrix H to calculate an internal status of the PN code generating shift register at a time t+M, and transmitting the internal status of the PN code generating shift register at the time t+M through the synchronous channel; and a step of receiving said internal status of said PN code generating shift register at the time t+M transmitted through said synchronous channel, setting said internal status of said PN code generating shift register at the time t+M in a shift register of said receiver.

In the above invention, the transmitter calculates an internal status of a PN code generating shift register at a time after time interval M that is arranged in advance with the receiver from a predetermined time by multiplying an internal status of its PN code generating shift register by a matrix $H^M$ that is calculated in advance, and transmits the calculation result to the receiver through a synchronous channel.

The receiver receives the internal status of a PN code generating shift register at a time t+M, sets the received internal status of a PN code generating shift register at a time t+M to a shift register thereof. Then it generates a PN code based on the internal status of a PN code generating shift register at a time t+M.

BRIEF DESCRIPTION OF THE DRAWINGS

FIG. 1 is a figure showing an example of a matrix H.

DESCRIPTION OF PREFERRED EMBODIMENTS OF THE INVENTION

Figure 2:
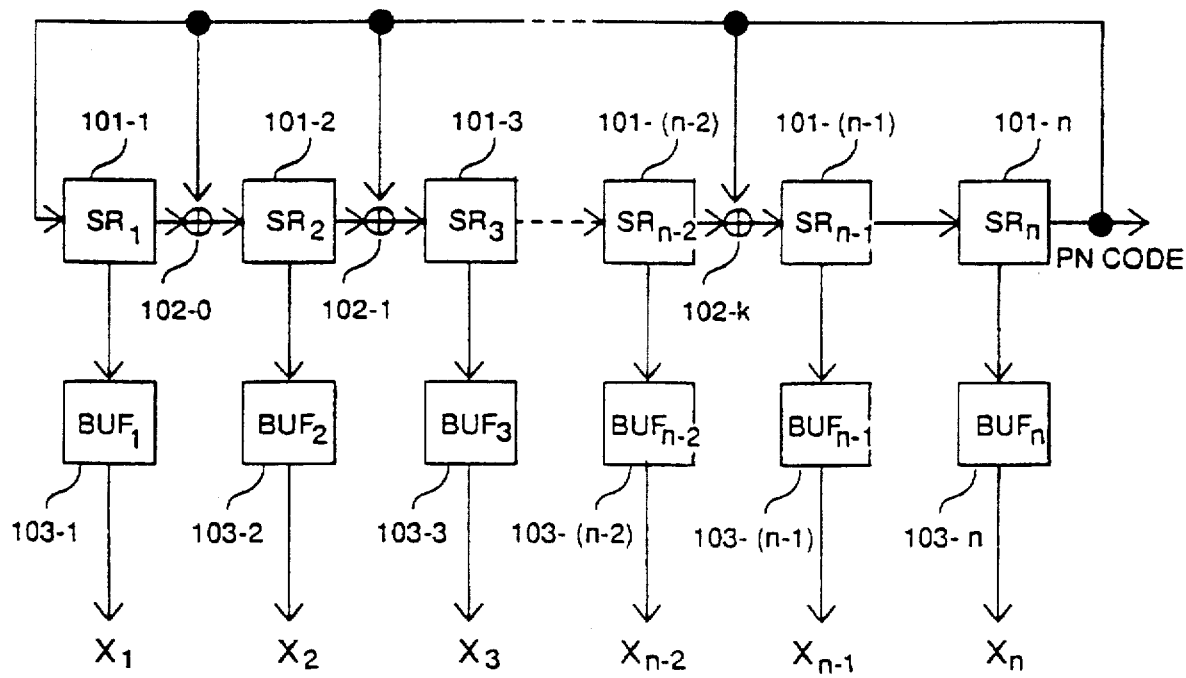
FIG. 2 is a circuit diagram showing a PN code sequence generating circuit used in a transmitter and a receiver of the present invention.

In mobile communication systems using spread spectrum communication systems, for tracking synchronization of the identical PN code (long code) used in a transmitter and a receiver, using an internal status of a PN code generating shift register at certain time, the present invention calculates an internal status of shift register after a predetermined time. And, with setting a value of the shift register in the receiver at a predetermined time, synchronization between the PN codes used in the transmitter and that in the receiver can be acquired.

Next, synchronizing method of the present invention is explained.

Letting an internal status of shift register fetched at the time t in the transmitter be $X_1$ to $X_n$, an internal status of shift register at a time (t+1) after 1 chip time interval from the time t be $Y_1$ to $Y_n$, the following equation is met.

$$Y_1 = H_{11}X_1 + H_{12}X_2 + \ldots + H_{1n}X_n \quad (1)$$
$$Y_2 = H_{21}X_1 + H_{22}X_2 + \ldots + H_{2n}X_n$$
$$\vdots$$
$$Y_n = H_{n1}X_1 + H_{n2}X_2 + \ldots + H_{nn}X_n$$

Here, the above equations can be transformed to a matrix as below. Equation (2).

$$\begin{bmatrix} Y_1 \\ Y_2 \\ \cdot \\ \cdot \\ \cdot \\ Y_n \end{bmatrix} = \begin{bmatrix} H_{11} & H_{12} & \cdots & H_{1n} \\ H_{21} & H_{22} & \cdots & H_{2n} \\ \cdot & \cdot & & \cdot \\ \cdot & \cdot & & \cdot \\ \cdot & \cdot & & \cdot \\ H_{n1} & H_{n2} & \cdots & H_{nn} \end{bmatrix} \begin{bmatrix} X_1 \\ X_2 \\ \cdot \\ \cdot \\ \cdot \\ X_n \end{bmatrix} \quad (2)$$

Next, an example of matrix H is shown as below.

Figure 1:
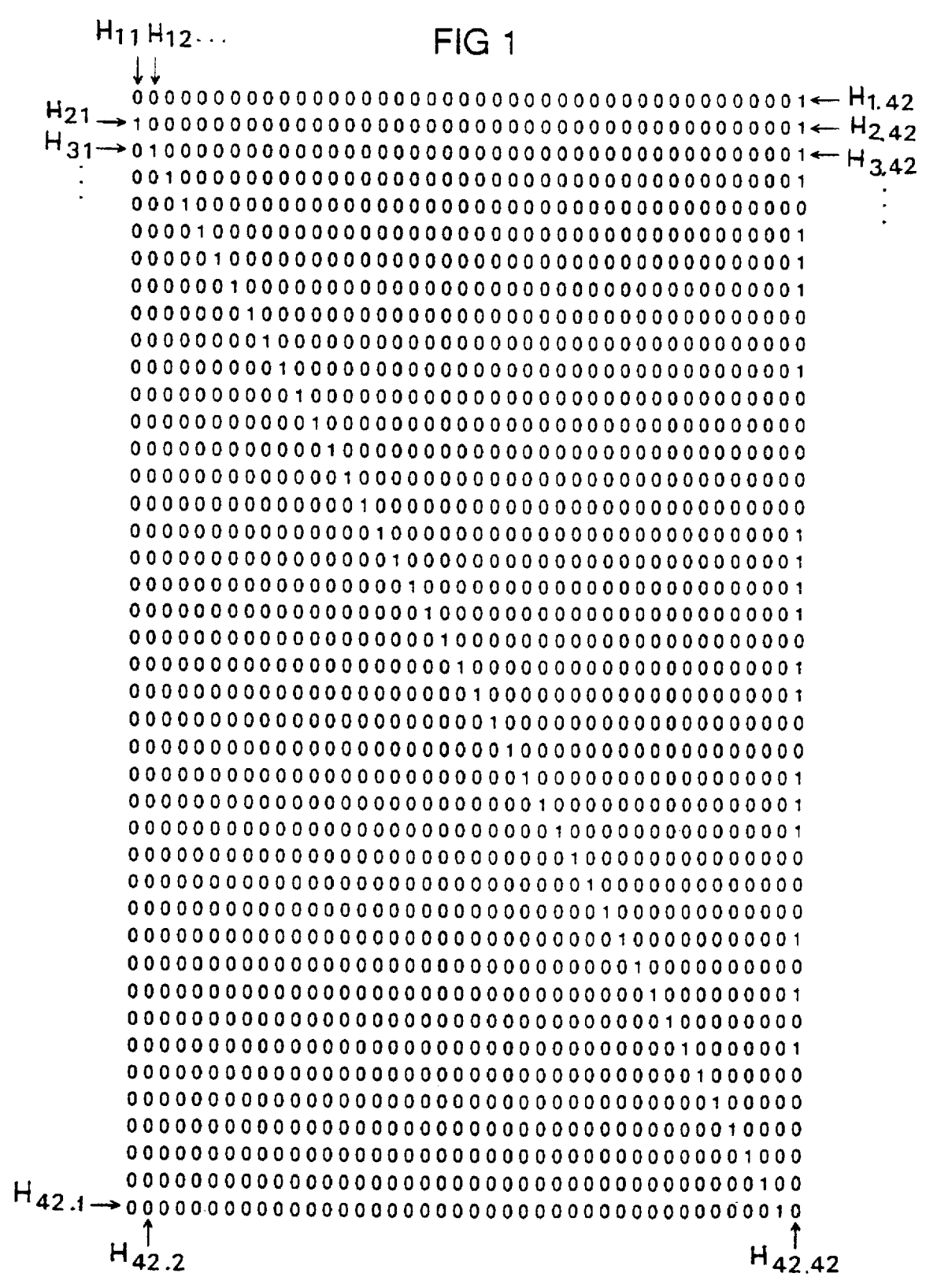

FIG. 1 is a figure showing a matrix, as an example of the matrix H, produced by a generating polynomial (3) meeting TIA IS-95 standards to generate a PN code sequence.

$$P(x)=X^{42}+X^{35}+X^{33}+X^{31}+X^{27}+X^{26}+X^{25}+X^{22}X^{21}+X^{19}+X^{18}+X^{17}+X^{16}+X^{10}+X^{7}+X^{6}+X^{5}+X^{3}+X^{2}+X^{1}+1 \quad (3)$$

From Equation (3), a value of bit that is returned to LSB (least significant bit) of the shift register becomes the value of MSB (most significant bit) of the shift register. Therefore, $H_{1,42}$ in FIG. 1 is 1.

The contents of a register next to the LSB is an exclusive-OR of the content of LSB and that of MSB that is fed back, so the contents of $H_{2,1}$ and $H_{2,42}$ becomes 1.

The matrix H is generated as above.

Next, letting an internal status of shift register after 2 chip time interval (t+2) be $Z_1$ to $Z_n$, Equation (4) is met.

$$\begin{bmatrix} Z_1 \\ Z_2 \\ \cdot \\ \cdot \\ \cdot \\ Z_n \end{bmatrix} = \begin{bmatrix} H_{11} & H_{12} & \cdots & H_{1n} \\ H_{21} & H_{22} & \cdots & H_{2n} \\ \cdot & \cdot & & \cdot \\ \cdot & \cdot & & \cdot \\ \cdot & \cdot & & \cdot \\ H_{n1} & H_{n2} & \cdots & H_{nn} \end{bmatrix} \begin{bmatrix} Y_1 \\ Y_2 \\ \cdot \\ \cdot \\ \cdot \\ Y_n \end{bmatrix} \quad (4)$$

$$= \begin{bmatrix} H_{11} & H_{12} & \cdots & H_{1n} \\ H_{21} & H_{22} & \cdots & H_{2n} \\ \cdot & \cdot & & \cdot \\ \cdot & \cdot & & \cdot \\ \cdot & \cdot & & \cdot \\ H_{n1} & H_{n2} & \cdots & H_{nn} \end{bmatrix}^2 \begin{bmatrix} X_1 \\ X_2 \\ \cdot \\ \cdot \\ \cdot \\ X_n \end{bmatrix}$$

Therefore, letting an internal status of shift register after M chip time interval (t+M) be $A_1$ to $A_n$, Equation (5) is met.

$$\begin{bmatrix} A_1 \\ A_2 \\ \cdot \\ \cdot \\ \cdot \\ A_n \end{bmatrix} = \begin{bmatrix} H_{11} & H_{12} & \cdots & H_{1n} \\ H_{21} & H_{22} & \cdots & H_{2n} \\ \cdot & \cdot & & \cdot \\ \cdot & \cdot & & \cdot \\ \cdot & \cdot & & \cdot \\ H_{n1} & H_{n2} & \cdots & H_{nn} \end{bmatrix}^M \begin{bmatrix} X_1 \\ X_2 \\ \cdot \\ \cdot \\ \cdot \\ X_n \end{bmatrix} \quad (5)$$

With the above method, only one matrix operation can give an internal status of shift register after M chip time interval, providing that M-th power of a matrix H is calculated in advance.

Next, the embodiments are explained, referring to figures.

FIG. 2 is a circuit diagram showing a PN code sequence generating circuit used in a transmitter and a receiver of the present invention.

A PN code sequence is generated through shift registers 101-1 to 101-n and exclusive-OR gates 102-0 to 102-k. $X_1$ to $X_n$ that represent an internal status of shift register are stored in buffers 103-1 to 103-n for fetch, respectively.

Figure 3:
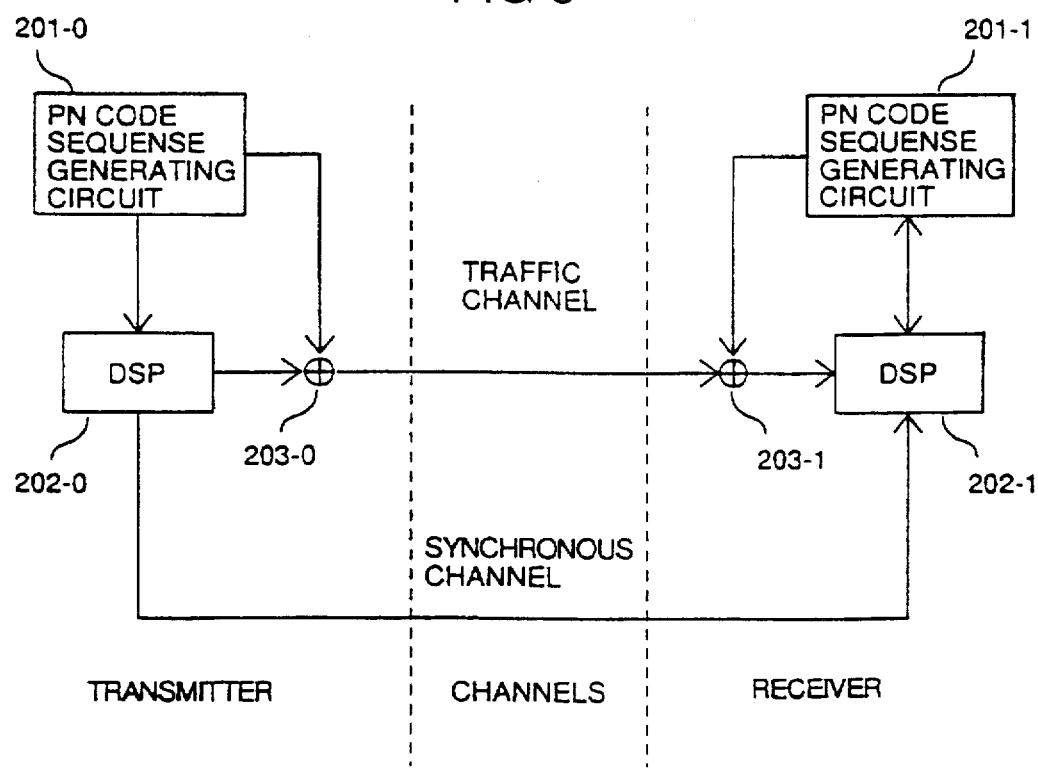
FIG. 3 illustrates a block diagram of the transmitter and the receiver.

FIG. 3 illustrates a block diagram of the transmitter and the receiver.

The DSP202-0 fetches the internal status of shift register represented by $X_1$ to $X_n$ from a PN code sequence generator circuit 201-0. Then fetched data is multiplied by a matrix $H^M$ calculated in advance to calculate an internal status of the PN code generating shift register after a time interval M that is predetermined between the receiver and the transmitter. The calculated internal status is sent to the receiver via a synchronous channel.

The receiver receives the internal status of a PN code generating shift register at a time t+M, sets the received internal status of a PN code generating shift register at a time t+M to a shift register of PN code sequence generating circuit 201-1. Then the shift register of a PN code sequence generator circuit 201-1 generates a PN code based on the internal status of a PN code generating shift register at a time t+M.

Figure 4:
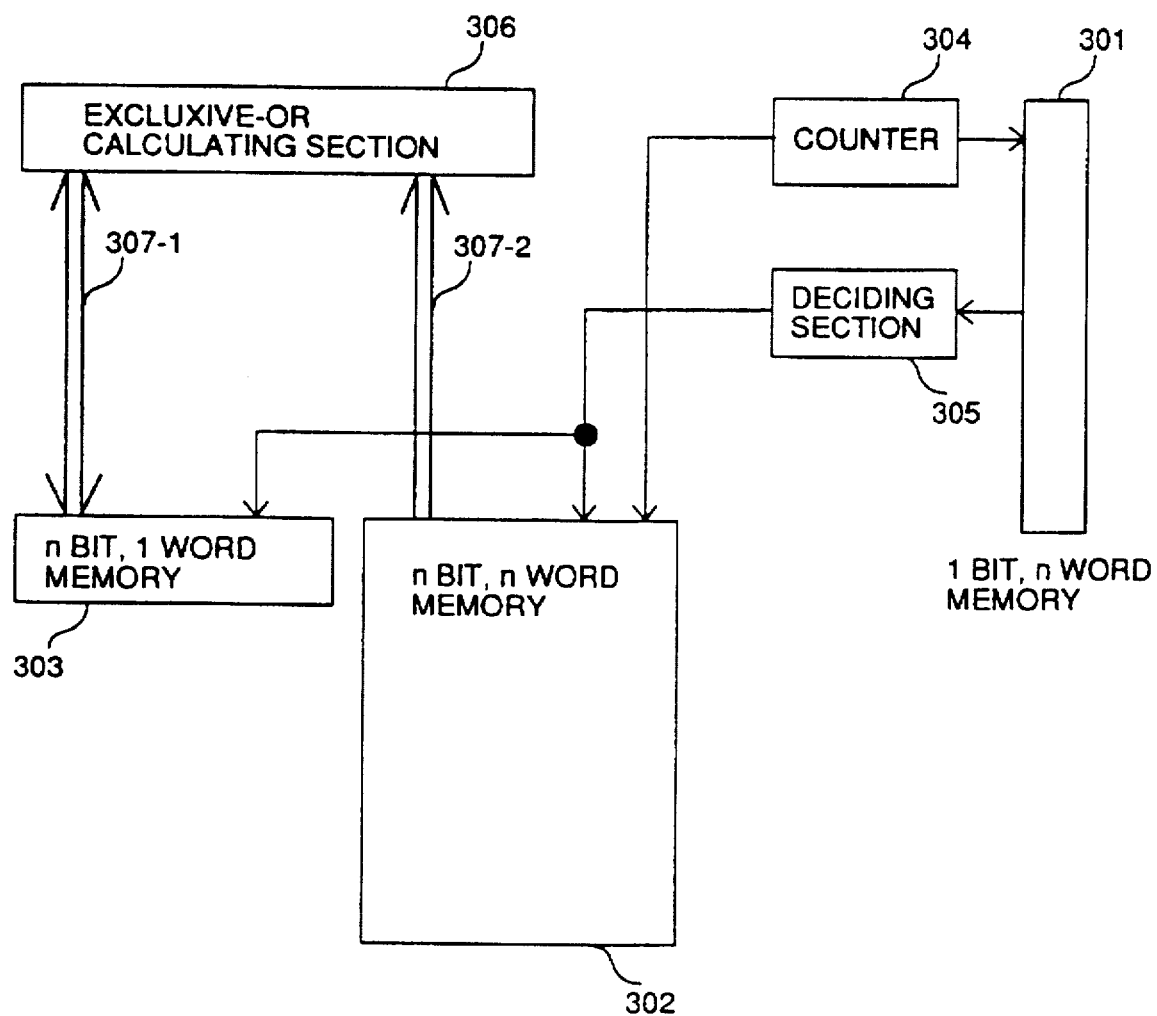
FIG. 4 illustrates a principal part of the DSP202-0.

FIG. 4 illustrates a principal part of the DSP202-0. The DSP202-1 has the same configuration as this. Processing is conducted by a flow illustrated in FIG. 5.

The circuit comprises a 1 bit×n word memory (301) for storing an internal status of shift register $X_1$ to $X_n$ at a current time, an n bit×n word memory (302) for storing the matrix $H^M$ (a matrix $H^N$ for DSP202-1) calculated in advance, and an n bit×1 word memory (303) for outputting an internal status of shift register after a predetermined time interval (a result of matrix operation).

In addition, this circuit comprises a counter (304) for incrementing the counted number from 1 to n by 1, a deciding section (305) for checking data, and an calculating section (306) for executing exclusive-OR operations. The n bit×n word memory 302 and n bit×1 word memory 303 are connected to the calculating section 306 via buses (307-1 and 307-2), respectively.

Figure 5:
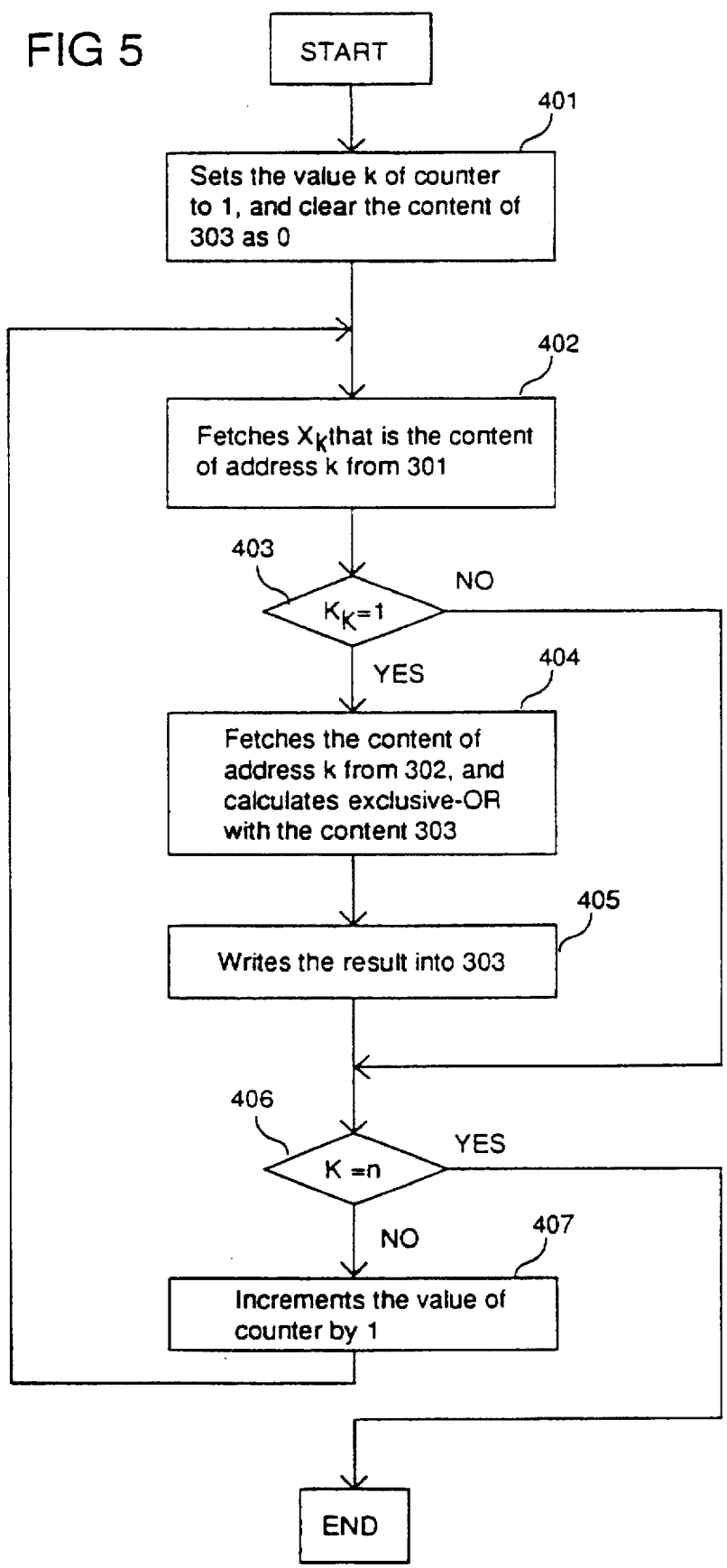
FIG. 5 is a flow chart for explaining operations of the present invention.

Next, the operations of the embodiment of the present invention are further explained, referring to the flow chart of FIG. 5.

First, the value K of the counter 304 is set to 1, and the n bit×1 word memory 303 is set to 0 (Step 401).

The content $X_k$ of address K in the 1 bit×n word memory 301 is fetched (Step 402) and the deciding section 305 checks the data whether it is 1 or 0 (Step 403). In case of $X_k=0$, the process goes to Step 406.

If $X_k=1$ (in case of Yes at Step 403), the contents of address K of the n bit×n word memory 302 and the contents of the n bit×1 word memory 303 are fetched and calculating section 306 executes exclusive-OR operation (Step 404). The result is stored in the n bit×1 word memory 303 (Step 405). Then, the process goes to Step 406.

At the Step 406, in case that the value K of the counter 304 is in K<n (checking result is No), the value K of the counter 304 is incremented by 1 (Step 407), the process goes back to Step 402 and the above-mentioned processing is repeated. In case of K=n (in case of Yes at Step 406), the processing ends.

At this time, a calculated internal status of shift register at the time (t+M) is stored in the n bit×1 word memory 303.

In the receiver, the receiver receives the internal status of shift register at the time (t+M), sets the result to the shift register of the PN code sequence generating circuit 201-1, thus synchronization of the PN code is established. Then the receiver receives data signals through traffic channels. The received signals are despread in the exclusive-OR gate 203-1 with the PN code from the PN code sequence generating circuit 201-1. The despread signals are processed in DSP 202-1, thus the received signals are demodulated.

Next, DSP 202-1 calculates an internal status of shift register at a time t+M+N by multiplying the internal status of the shift register at the time t+M by $H^N$. Then it sets the resulted internal status of shift register at a time t+M+N to the shift register of PN code sequence generating circuit 201-1, generates a PN code at the time t+M+N, despreads data signals using this generated PN code.

Continuously, DSP 202-1 calculates an internal status of shift register at a time t+M+2N by multiplying the internal status of the shift register at the time t+M+N by $H^N$. Similarly to this, an internal status of shift register at a time t+M+3N is calculated by further multiplying the internal status of shift register at a time t+M+2N by $H^N$. PN codes at the time t+M+2N and the time t+M+3N are generated based on these results.

Thus, processing time for generating PN codes are reduced.

What is claimed is:

1. A PN code synchronizing method in spread spectrum communication systems using a plurality of traffic channels and at least one synchronous channel, comprising a step of calculating a value by multiplying an internal status of a PN code generating shift register at a time t by M-th power of a matrix H ($H^M$) that is preset in advance and transmitting said value to a receiver through said synchronous channel.

2. The PN code synchronizing method in spread spectrum communication systems of claim 1, wherein said matrix H is derived from a PN code generating polynomial.

3. The PN code synchronizing method in spread spectrum communication systems of claim 1, comprising:
   (1) step of calculating said matrix H based on tap locations of said PN code generating shift register; and
   (2) step of calculating an internal status of said PN code generating shift register at a time t+M by multiplying said internal status of said PN code generating shift register at the time t by M-th power of said matrix H, and transmitting said internal status of said PN code generating shift register at the time t+M through said synchronous channel.

4. The PN code synchronizing method in spread spectrum communication systems of claim 3, wherein said (2) step comprising:
   (a) step of clearing as 0 all the contents of an n bit×1 word memory for storing said internal status of said PN code generating shift register at the time t+M, where length of said PN code generating shift register is n;
   (b) step of storing said internal status of said PN code generating shift register at the time t into a 1 bit×n word memory;
   (c) step of storing the contents of said matrix $H^M$ into an n bit×n word memory;
   (d) step of detecting an address storing 1 in said 1 bit×n word memory from the first address one by one, when having detected an address storing t calculating an exclusive-OR of the contents of an address of said n bit×n word memory which is corresponding to a detected address storing 1 of said 1 bit×n word memory and the contents of said n bit×1 word memory, and storing a calculation result into said n bit×1 word memory; and
   (e) step of repeating said (d) step n times and storing said internal status of said PN code generating shift register at the time t+M into said n bit×1 word memory.

5. The PN code synchronizing method in spread spectrum communication systems of claim 2, further comprising, in a reception side;
   (3) step of receiving said internal status of said PN code generating shift register at the time t+M transmitted through said synchronous channel, setting said internal status of said PN code generating shift register at the time t+M in a shift register of said receiver.

6. A PN code synchronizing method in spread spectrum communication systems using a plurality of traffic channels and at least one synchronous channel, comprising:
   (1) step of calculating a matrix H based on tap locations of a PN code generating shift register;
   (2) step of calculating an internal status of said PN code generating shift register at a time t+M by multiplying an internal status of a PN code generating shift register at a time t by M-th power of said matrix H ($H^M$), and transmitting said internal status of said PN code generating shift register at the time t+M through said synchronous channel; and
   (3) step of receiving said internal status of said PN code generating shift register at the time t+M transmitted through said synchronous channel, setting said internal status of said PN code generating shift register at the time t+M in a shift register of said receiver.

7. The PN code synchronizing method in spread spectrum communication systems of claim 6, wherein said (2) step comprising:
   (a) step of clearing as 0 all the contents of an n bit×1 word memory for storing said internal status of said PN code generating shift register at the time t+M, where length of said PN code generating shift register is n;
   (b) step of storing said internal status of said PN code generating shift register at the time t into a 1 bit×n word memory;
   (c) step of storing the contents of said matrix $H^M$ into an n bit×n word memory;
   (d) step of detecting an address storing 1 in said 1 bit×n word memory from the first address one by one, when having detected an address storing 1 calculating an exclusive-OR of the contents of an address of said n bit×n word memory which is corresponding to a detected address storing 1 of said 1 bit×n word memory and the contents of said n bit×1 word memory, and storing a calculation result into said n bit×1 word memory;
   (e) step of repeating said (d) step n times and storing said internal status of said PN code generating shift register at the time t+M into said n bit×1 word memory; and
   (f) step of transmitting the contents stored in said n bit×1 word memory through said synchronous channel.

8. A spread spectrum transmitter comprising:
   a shift register for generating a PN code; and
   a calculating means for calculating an internal digital value of the shift register after the elapse of time "M" using a matrix $H^M$, wherein the term "M" represents the time from when a receiver receives a synchronization channel to when the receiver receives a signal on the communication channel.

9. A spread spectrum transmitter comprising:
   a shift register for generating a PN code;
   a calculating means for calculating an internal status of shift register at a time after a predetermined time interval M from a time t,
   said calculating means comprising:
   a first storing means for storing said internal status of shift register at the time t;
   a second storing means for storing M-th power of a matrix H ($H^M$) derived from tap locations of said shift register;

a multiplying means for multiplying the contents stored in said first storing means and the contents of said second storing means; and a third storing means for storing a calculation result of said multiplying means.

10. The spread spectrum transmitter of claim 9, wherein said calculating means comprising:

a 1 bit×n word memory for storing said internal status of shift register at the time t, where length of said shift register is n;

an n bit×n word memory for storing a matrix $H^M$ derived from tap locations of said shift register;

an n bit×1 word memory for storing an internal status of shift register at a time t+M; and a calculating section for clearing as 0 all the contents of said n bit×1 word memory and calculating an exclusive-OR of the contents of an address of said n bit×n word memory which is corresponding to an address of said 1 bit×n word memory and the contents of said n bit×1 word memory.

11. The spread spectrum transmitter of claim 10, wherein said calculating section comprising:

a deciding circuit for fetching the contents of said 1 bit×n word memory from address 1 to address n one by one, and detecting an address storing 1;

a calculating circuit for calculating, when having detected an address storing 1, exclusive-OR of the contents of an address of said n bit×n word memory which is corresponding to the detected address storing 1 of said 1 bit×n word memory and the contents of said n bit×1 word memory and storing this calculation result into said n bit×1 word memory;

a counter for counting a number of operations of said deciding circuit.

12. A spread spectrum transmitter comprising:

a shift register for generating a PN code;

a calculating means for calculating an internal status of shift register at a time after a predetermined time interval M from a time t; and further comprising a transmitting means for transmitting an internal status of shift register at a time after the time interval M from the time t.

13. A spread spectrum transmitter comprising:

a shift register for generating a PN code;

a 1 bit×n word memory for storing an internal status of shift register at a time t, where length of said shift register is n;

an n bit×n word memory for storing M-th power of a matrix H ($H^M$) derived from tap locations of said shift register;

an n bit×1 word memory for storing an internal status of shift register at a time t+M;

a deciding means for fetching the contents of said 1 bit×n word memory from address 1 to address n one by one, and detecting an address storing 1;

a counter for counting a number of operations of said deciding means; and an exclusive-OR calculating means for calculating, when having detected an address storing 1, exclusive-OR of the contents of an address of said n bit×n word memory which is corresponding to the detected address storing 1 of said 1 bit×n word memory and the contents of said n bit×1 word memory and storing this calculation result into said n bit×1 word memory until the counted number of said counter becomes n.

14. The spread spectrum transmitter of claim 13, further comprising transmitting means for transmitting the contents of said n bit×1 word memory.

15. A spread spectrum receiver comprising:

a shift register being set in an internal status of shift register at the time s that has been transmitted, for generating a PN code; and a calculating means for calculating an internal status of shift register at a time s+N based on said internal status of shift register at the time s.

16. The spread spectrum receiver of claim 15, wherein said calculating means comprising:

a first storing means for storing an internal status of shift register at the time s;

a second storing means for storing N-th power of a matrix H ($H^N$) derived from tap locations of said shift register;

a multiplying means for multiplying the contents stored in said first storing means and the contents of said second storing means; and a third storing means for storing a calculation result of said multiplying means.

17. The spread spectrum receiver of claim 15, wherein said calculating means comprising:

a 1 bit×n word memory for storing said internal status of shift register at the time s, where length of said shift register is n;

an n bit×n word memory for storing a matrix $H^N$ derived from tap locations of said shift register;

an n bit×1 word memory for storing an internal status of shift register at a time s+N; and a calculating section for clearing as 0 all the contents of said n bit×1 word memory and calculating an exclusive-OR of the contents of an address of said n bit×n word memory which is corresponding to an address of said 1 bit×n word memory and the contents of said n bit×1 word memory.

18. The spread spectrum receiver of claim 17, wherein said calculating section comprising:

a deciding circuit for fetching the contents of said 1 bit×n word memory from address 1 to address n one by one, and detecting an address storing 1;

a calculating means for calculating, when having detected an address storing 1, exclusive-OR of the contents of an address of said n bit×n word memory which is corresponding to the detected address storing 1 of said 1 bit×n word memory and the contents of said n bit×1 word memory and storing this calculation result into said n bit×1 word memory; and a counter for counting a number of operations of said deciding circuit.

19. A spread spectrum receiver comprising:

a shift register being set in an internal status of shift register at the time s that has been transmitted, for generating a PN code;

a 1 bit×n word memory for storing an internal status of shift register at a time s, where length of said shift register is n;

an n bit×n word memory for storing N-th power of a matrix H derived from tap locations of said shift register;

an n bit×1 word memory for storing an internal status of shift register at a time s+N;

a deciding means for fetching the contents of said 1 bit×n word memory from address 1 to address n one by one, and detecting an address storing 1;

a counter for counting a number of operations of said deciding means; and an exclusive-OR calculating means for calculating, when having detected an address storing 1, exclusive-OR of the contents of an address of said n bit×n word memory which is corresponding to the detected address storing 1 of said 1 bit×n word memory and the contents of said n bit×1 word memory and storing this calculation result into said n bit×1 word memory until the counted number by said counter becomes n.

* * * * *